United States Patent [19]

Yamada

[11] Patent Number: 5,745,070
[45] Date of Patent: Apr. 28, 1998

[54] VEHICLE ACCURATELY DETECT AN OBJECT IN A LANE OF THE RADAR EQUIPPED VEHICLE MOVING IN A CURVE

[75] Inventor: Yukinori Yamada, Susono, Japan

[73] Assignee: Toyota Jidosha Kabushiki Kaisha, Toyota, Japan

[21] Appl. No.: 777,968

[22] Filed: Dec. 24, 1996

[30] Foreign Application Priority Data

Aug. 12, 1996 [JP] Japan ................................. 8-212813

[51] Int. Cl.$^6$ ...................................................... G01S 13/93
[52] U.S. Cl. .................. 342/70; 342/71; 342/158; 340/903; 340/435; 340/436
[58] Field of Search ................... 342/70, 71, 72, 342/158; 340/903, 435, 436

[56] References Cited

U.S. PATENT DOCUMENTS

| | | | |
|---|---|---|---|
| 5,579,010 | 11/1996 | Iihoshi et al. | 342/70 |
| 5,585,798 | 12/1996 | Yoshioka et al. | 342/70 |
| 5,670,963 | 9/1997 | Kubota et al. | 342/70 |
| 5,680,097 | 10/1997 | Uemura et al. | 340/435 |
| 5,684,490 | 11/1997 | Young et al. | 342/70 |
| 5,689,264 | 11/1997 | Ishikawa et al. | 342/70 |

Primary Examiner—John B. Sotomayor
Attorney, Agent, or Firm—Cushman Darby & Cushman IP Group of Pillsbury Madison & Sutro LLP

[57] ABSTRACT

A scan-type radar apparatus for a vehicle which determines with a high level of accuracy whether an object detected by the radar exists in the lane in which the radar equipped vehicle is moving while the radar equipped vehicle is moving in a curve. A scan-type radar detects objects existing in a detectable range. A center direction is assumed which indicates a center of each of the objects detected by the scan-type radar with respect to the vehicle based on a distance between the vehicle and each of the objects and a turning radius of the vehicle. A vehicle moving lane area is set within the detectable range. The vehicle moving lane area, which corresponds to a vehicle moving lane in which the vehicle is moving, extends on either side of the center direction with a predetermined angle range. An extent of the vehicle moving lane area is corrected so that an inner area of the vehicle moving lane area is increased when the vehicle is moving along a curve, the inner area being a portion of the vehicle moving lane area located on an inner side of the curve with respect to the center direction.

10 Claims, 8 Drawing Sheets

$\theta_{VH} = \tan^{-1}(W/2L)$ $\theta_{CV} = \sin^{-1}(L/2R)$

VEHICLE ACCURATELY DETECT AN OBJECT IN A LANE OF THE RADAR EQUIPPED VEHICLE MOVING IN A CURVE

BACKGROUND OF THE INVENTION

1. Field of the Invention

The present invention relates to a scan-type radar provided on a vehicle and, more particularly, to a scan-type radar apparatus which detects an object existing in a lane in which the radar equipped vehicle is moving.

2. Description of the Related Art

Conventionally, a radar apparatus for a vehicle which detects an object anterior to the radar equipped vehicle is known, for example, in Japanese Laid-Open Patent Application No.6-150195. This conventional radar apparatus comprises a radar which is capable of detecting the positions and orientations of a plurality of objects existing in a wide area anterior to the radar equipped vehicle. According to such a radar apparatus, a relative position of each of the objects existing in the detectable range with respect to the radar equipped vehicle can be detected.

In order to utilize the results of the radar apparatus for the control of a vehicle operation, it is required to accurately determine whether the objects detected by the radar apparatus exist in the lane in which the radar equipped vehicle is moving. Hereinafter, the lane in which the radar equipped vehicle is moving may be referred to as a radar equipped vehicle moving lane. Additionally, the object existing in the radar equipped vehicle moving lane may be referred to as a radar equipped vehicle moving lane object or a vehicle moving lane object. In order to determined whether or not an object is in the vehicle moving lane, it is required to assume a vehicle moving lane area within the detectable range of the radar and determine whether the object exists in the vehicle moving lane area.

When the radar equipped vehicle is moving in a straight lane, it can be assumed that the radar equipped vehicle moving lane extends forwardly of the radar equipped vehicle. In such a case, an area extending forwardly and having a predetermined width within the detectable range may be assumed to be the radar equipped vehicle moving lane.

Additionally, an accurate determination as to whether an object exists in the radar equipped vehicle moving lane can be made by determining whether the direction of the center of the object with respect to the radar equipped vehicle is included in the vehicle moving lane area.

The object existing anterior of the radar equipped vehicle is detected as an object having a certain width within the detectable range of the radar. When the radar equipped vehicle and the object are moving in a straight lane, the center of the object recognized by the radar corresponds to the actual center of the width of the object. Hereinafter, the center of the object recognized by the radar is referred to as a data center. Accordingly, when the radar equipped vehicle is moving in a straight lane, an accurate determination as to whether an object exists in the vehicle moving lane is made by determining whether the direction of the data center of the object is included in the vehicle moving lane area.

Additionally, when the radar equipped vehicle is moving in a curve, it can be assumed that the radar equipped vehicle moving lane is offset or shifted toward the inner side of the curve. A portion of the vehicle moving lane area a distance L away from the radar equipped vehicle can be obtained based on the distance L and the radius of curvature R of the curve. The radius of curvature R of the vehicle moving lane can be assumed based on an operational condition, for example, a yaw rate $w_y$. Accordingly, when the radar equipped vehicle is moving along a curve, the vehicle moving lane can be assumed based on the distance L as a parameter.

As mentioned above, it can be determined whether a detected object exists in the vehicle moving lane by determining whether or not the center of the object is included in the vehicle moving lane area. Accordingly, if the center of the object is accurately detected, an accurate determination as to whether or not the object exists in the vehicle moving lane is made based on the determination as to whether or not the detected center of the object is included in the vehicle moving lane area.

However, when the radar equipped vehicle is moving in a curve, the rear of the object is not parallel to the front of the radar equipped vehicle. In such a condition, the radar wave from the radar of the radar equipped vehicle is projected to the rear face, a side (positioned on the inner side of the curve) and a corner between the rear surface and the side surface of the object. The radar wave projected on the rear surface and the side surface is reflected mainly in a direction other than the radar equipped vehicle. On the other hand, the radar wave projected on the corner of the object is reflected toward the radar equipped vehicle by a relatively large amount as compared to the radar wave reflected by the rear and the side.

As mentioned above, when the radar wave reflected by the corner of the object is received by the radar apparatus, the object is detected as an object having a certain width. In this case, the center of the width, that is, the data center of the object indicates a position offset from the actual center of the width of the object. Thus, when the radar equipped vehicle is moving in a curve, unlike the case where the radar equipped vehicle is moving in a straight lane, the data center of the detected object may not correspond to the actual center of the width of the object.

When the data center of the object does not correspond to the actual center of the width of the object, the determination as to whether the object exists in the vehicle moving lane cannot be determined based on the determination as to whether or not the data center of the object is included in the vehicle moving lane area. Thus, in the above-mentioned method, when the radar equipped vehicle is moving in a curve, there is a problem in that an accurate determination cannot be made as to whether or not the object is the vehicle moving lane object.

SUMMARY OF THE INVENTION

It is a general object of the present invention to provide an improved and useful radar apparatus for a vehicle in which the above-mentioned problems are eliminated.

A more specific object of the present invention is to provide a scan-type radar apparatus for a vehicle which determines, with high accuracy, whether an object detected by the radar exists in the lane in which the radar equipped vehicle is moving while the radar equipped vehicle is moving along a curve.

In order to achieve the above-maintained object, there is provided according to the present invention a scan-type radar apparatus installed on a vehicle, comprising:

a scan-type radar for detecting objects existing in a detectable range;

object direction assuming means for assuming a center direction indicating a center of each of the objects detected by the scan-type radar with respect to the vehicle based on a distance between the vehicle and each of the objects and a radius of curvature of a curve where the vehicle is moving;

vehicle moving lane area setting means for setting a vehicle moving lane area corresponding to a vehicle moving lane in which the vehicle is moving, the vehicle moving lane area being set within the detectable range of the scan-type radar, the vehicle moving lane area extending on either side of the center direction with a predetermined angle range; and vehicle moving lane area correcting means for correcting an extent of the vehicle moving lane area so that an inner area of the vehicle moving lane area is increased when the vehicle is moving along a curve, the inner area being a portion of the vehicle moving lane area located on an inner side of the curve with respect to the center direction.

According to the above-mentioned invention, the vehicle moving lane area is assumed to extend with a predetermined width on either side of the center direction indicating the center of the object ahead of the radar equipped vehicle. When the radar equipped vehicle is moving in a curve, the direction of the object ahead of the vehicle is detected by the scan-type radar at a position shifted toward the inner side of the curve from the true center direction. In this invention, the vehicle moving lane area is corrected so that the inner area of the vehicle moving lane area is increased. This results in both the direction of the object and the vehicle moving lane area being shifted toward the inner side of the curve. Thus, an accurate determination can be performed as to whether the object exists in the vehicle moving lane when the radar equipped vehicle is moving in the curve.

In the present invention, the detectable range may be scanned with a fixed scan angle, and the vehicle moving lane area correcting means may correct the vehicle moving lane area by shifting a direction of a center of the vehicle moving lane area set by the vehicle moving area setting means toward the inner side of the curve.

Additionally, in the present invention, the vehicle moving lane area may includes a fixed area between a left side area and a right side area, the fixed area having a predetermined width, the left side area being located on the left side of the center direction and the right side area being located on the right side of the center direction.

In this invention, the vehicle moving lane area includes the fixed area which is not corrected by the vehicle moving lane area correcting means. Thus, an amount of correction made to the vehicle moving lane area is limited to an appropriate range, resulting in the prevention of an excessive correction of the vehicle moving lane area. The predetermined width may correspond to a width of each of the objects.

Additionally, the vehicle moving lane area correcting means may correct the extent of the vehicle moving lane area so that one of the left side area and the right side area is increased when the vehicle is moving along a curve, the one of the left side area and the right side area being located on the inner side of the curve with respect to the fixed area.

In one embodiment of the present invention, the detectable range may be scanned with a fixed scan angle, and the vehicle moving lane area may be defined by an angle range with respect to the center direction.

The inner area of the vehicle moving lane area may be defined by an angle range, and the vehicle moving lane area correcting means corrects the angle range of the inner area so as to correct an extent of the inner area.

Alternatively, each of the left side area and the right side area is defined by an angle range, and the vehicle moving lane area correcting means corrects the angle range of one of the left side area and the right side area so as to correct an extent of the one of the left side area and the right side area.

The width of the vehicle moving lane area defined by the angle range is increased as a distance from the radar equipped vehicle is increased. When a distance between the object and the radar equipped vehicle is short, the sensitivity of the radar is high. Thus, an accurate determination of the existence of the object in the vehicle moving lane is performed even when the width of the vehicle moving lane area is small. When the distance between the object and the radar equipped vehicle is increased, the sensitivity of the radar is decreased. Thus, the width of the vehicle moving lane area must be increased. In the present invention, since the vehicle moving lane area is defined by the angle range, the width of the vehicle moving lane area is increased as the distance from the radar equipped vehicle is increased. Thus, an accurate determination can be performed as to whether the object exists in the vehicle moving lane irrespective of the distance between the object and the radar equipped vehicle.

In the present invention, the vehicle moving lane area correcting means comprises correction amount determining means for determining an amount of correction based on the radius of curvature of the curve.

When the radar equipped vehicle and the object ahead of the radar equipped vehicle are moving in a curve, the object is detected in a direction shifted from the real direction of the object toward the inner side of the curve. The amount of shift is increased as the radius of curvature of the curve is decreased. Thus, in this invention, the amount of correction of the vehicle moving lane area is determined in response to the amount of shift of the direction of the object.

Other objects, features and advantages of the present invention will become more apparent from the following detailed description when read in conjunction with the accompanying drawings.

DETAILED DESCRIPTION OF THE PREFERRED EMBODIMENTS

Figure 1:
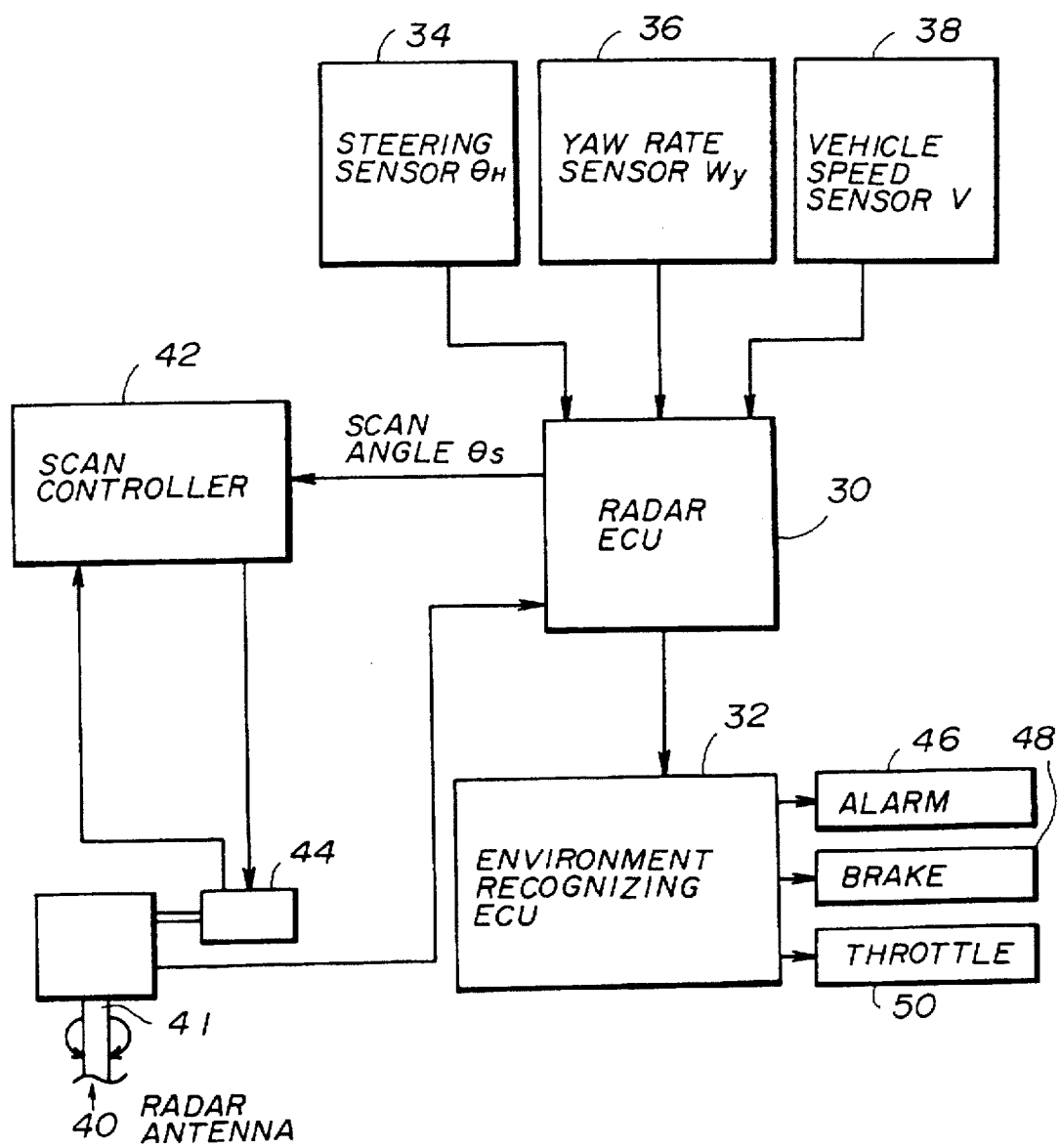
FIG. 1 is a block diagram of a scan-type radar apparatus for a vehicle according to a first embodiment of the present invention.

A description will now be given of a first embodiment of the present invention. FIG. 1 is a block diagram of a scan-type radar apparatus (may be referred to as simply a radar apparatus) for a vehicle according to the first embodiment of the present invention. The radar apparatus according to the first embodiment of the present invention is controlled by an electronic control unit 30 (hereinafter referred to as a radar ECU 30) for controlling the radar and an electronic control unit 32 (hereinafter referred to as a environment recognizing ECU 32) for controlling vehicle speed by recognizing an environment of a vehicle.

The radar ECU 30 is connected with a steering angle sensor 34, a yaw rate sensor 36 and a vehicle speed sensor 38. The steering angle sensor 34 generates a signal (steering angle signal $\Theta_H$) corresponding to the steering angle of a steering wheel. The yaw rate sensor 36 generates a signal (yaw rate signal $w_y$) corresponding to the angular velocity of the vehicle with respect to the center of gravity thereof. The vehicle speed sensor 38 generates a pulse signal (vehicle speed signal V) having a pulse period which varies in response to vehicle speed.

The radar ECU 30 assumes a turning radius R of the vehicle based on the steering angle signal $\Theta_H$, the yaw rate signal $w_y$ and the vehicle speed signal V. The turning radius R can be calculated based on one of the steering angle signal $\Theta_H$ and the yaw rate signal $w_y$. Thus, both the steering angle sensor 34 and the yaw rate sensor 36 are not needed, as the turning radius can be calculated by using one of the sensors.

The radar ECU 30 is connected with a radar antenna 40 and a scan controller 42. The radar antenna 40 is provided adjacent to the front grille of the vehicle and is pivotable with respect to a pivot axis extending in a vertical direction. The radar antenna 40 has a directivity to transmit and receive a signal with a predetermined beam spreading angle.

The radar antenna 40 is coupled to a scan mechanism 44 which swings the radar antenna 40. The scan mechanism 44 is feedback controlled by the scan controller 42. A scan angle signal is supplied to the scan controller 42 from the radar ECU 30. The scan controller 42 feedback controls the scan mechanism 44 so that the scan angle of the radar antenna 40 corresponds to a designating angle $\Theta_S$ supplied by the radar ECU 30. The radar ECU 30 varies the designating angle $\Theta_S$ at a predetermined period so that the detectable range anterior to the vehicle is scanned by the radar antenna 40.

The radar ECU 30 constitutes, together with the radar antenna 40, a known Frequency Modulation-Continuous Wave radar (FM-CW radar). That is, the radar ECU 30 controls the radar antenna 40 to transmit a predetermined transmission wave therefrom. The ECU 30 detects data of a relative distance RD and a relative velocity RV with respect to an object anterior to the radar equipped vehicle in a direction of the designating angle (scan angle $\Theta_S$) based on a reflection wave received by the radar antenna 40. The radar ECU 30 detects a state of the object in the detectable range based on the data, and sends the result of detection to the environment recognition ECU 32.

The environment recognizing ECU 32 is connected with an alarm 46, a brake 48 and a throttle 50. The environment recognizing ECU 32 controls the alarm 46 and a brake 48 or throttle 50 to decelerate the vehicle and draw the driver's attention, when an object anterior to the vehicle gets close to the vehicle, in accordance with a predetermined logic.

Figure 2:
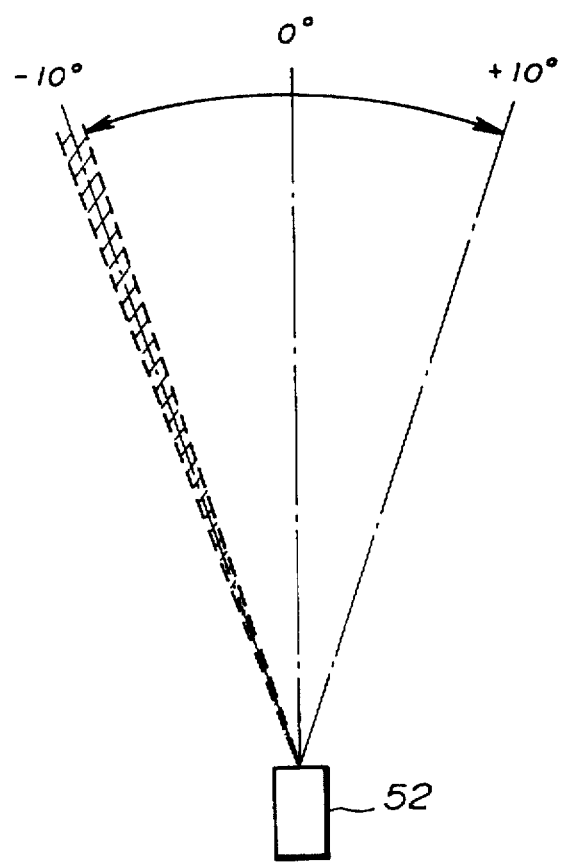
FIG. 2 is an illustration of a scanning area of the radar apparatus shown in FIG. 1.

FIG. 2 is an illustration of a scanning area of the radar apparatus according to the present embodiment. In FIG. 2, a vehicle 52 is equipped with the radar apparatus having the radar 40 shown in FIG. 1. In the present embodiment, the scanning area of the radar 40, which corresponds to the detectable range for an object, is a range extending anterior to the vehicle 52 at an angle of 10 degrees with respect to the longitudinal axis of the vehicle 52 to both the left and right side of the vehicle 52. Hereinafter, the area on the left side is assumed to be an area with a negative scan angle $\Theta_S$, and the area on the right side is assumed to be an area with a positive scan angle $\Theta_S$.

In the present embodiment, the radar antenna 40 is controlled to scan from $-10$ degrees to $+10$ degrees for every 100 msec. Additionally, the radar ECU 30 detects data of an object for each 0.5 degrees of the scan angle $\Theta_S$ when the radar antenna 40 scans the area shown in FIG. 2. That is, in the present embodiment, the detectable range is divided into 40 areas with 0.5 degrees interval. Thus, 40 sets of data is obtained when the radar antenna 40 scans the detectable range between $-10$ degrees and $+10$ degrees of the scan angle $\Theta_S$.

Figure 3:
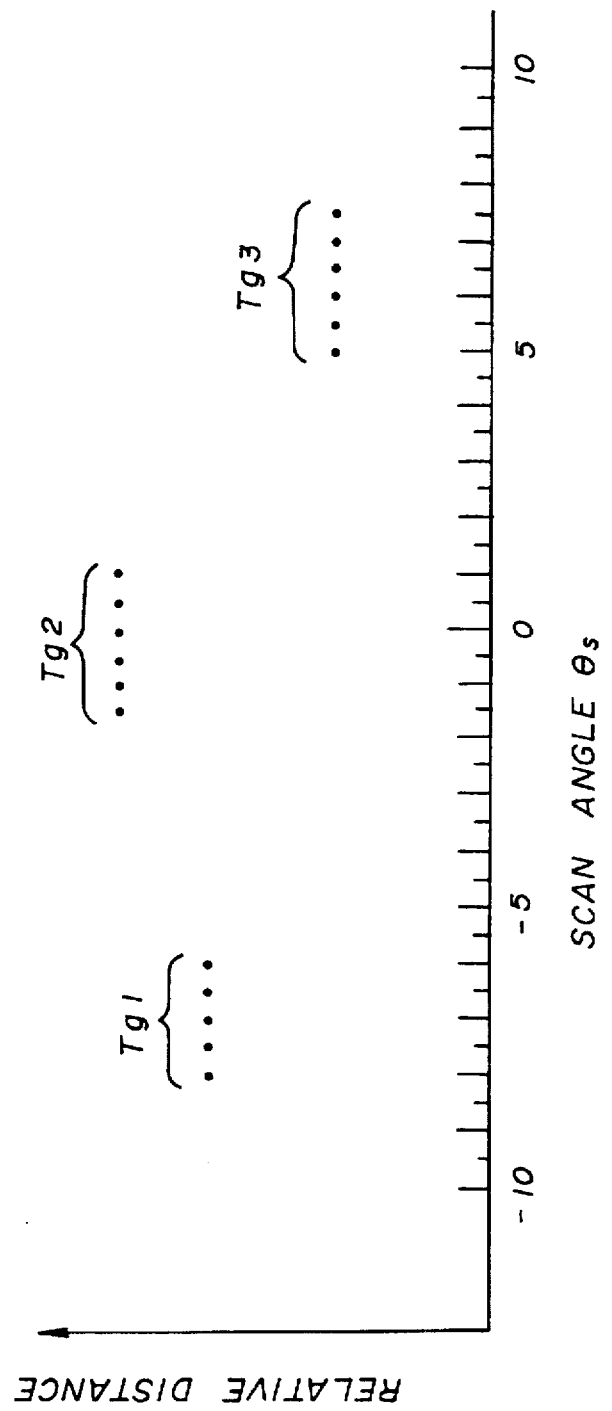
FIG. 3 is an illustration of sets of data with respect to objects (targets) detected by a radar ECU shown in FIG. 1.

FIG. 3 is an illustration of sets of data with respect to objects (targets) detected by the radar ECU 30. The sets of data in FIG. 3 indicate the corresponding scan angle $\Theta_S$ and the relative distance between each of the objects and the radar equipped vehicle 52. In FIG. 2, there are three targets Tg1 to Tg3. The target Tg1 is detected at an angular position corresponding to the scan angle $\Theta_S$ ranging from $-8$ degrees to $-6$ degrees. The target Tg2 is detected at an angular position corresponding to the scan angle $\Theta_S$ ranging from $-1.5$ degrees to $+1$ degree. The target Tg3 is detected at an angular position corresponding to the scan angle $\Theta_S$ ranging from $+5$ degrees to $+7.5$ degrees.

In the radar apparatus according to the present embodiment, the alarm 46, the brake 48 and the throttle 50 must be operated when an object is positioned close to the vehicle 52 in the lane (hereinafter referred to as a vehicle moving lane) in which the vehicle 52 is moving. In order to achieve such a function, it must be determined whether or not an object is in the vehicle moving lane based on the sets of data of the objects as shown in FIG. 3. Additionally, when it is determined that an object is in the vehicle moving lane, the alarm 46, the brake 48 and the throttle 50 must be controlled based on the relative distance RD and the relative velocity RV of the vehicle in the vehicle moving lane.

In the present embodiment, after the distribution of the objects as shown in FIG. 3 is obtained, sets of data indicating an angular position close to each other are grouped, each of the groups of sets of data indicates a single object. Then, the center angle of the scan angles corresponding to each of the grouped sets of data is calculated for each of the grouped sets of data. Hereinafter, the center angle of each group of sets of data is referred to as an actual center angle $\Theta_{cen}$r. It is determined whether or not an object is in the vehicle moving lane based on the determination as to whether or not the actual center angle $\Theta_{cen}$r is positioned within the vehicle moving lane.

Figure 4:
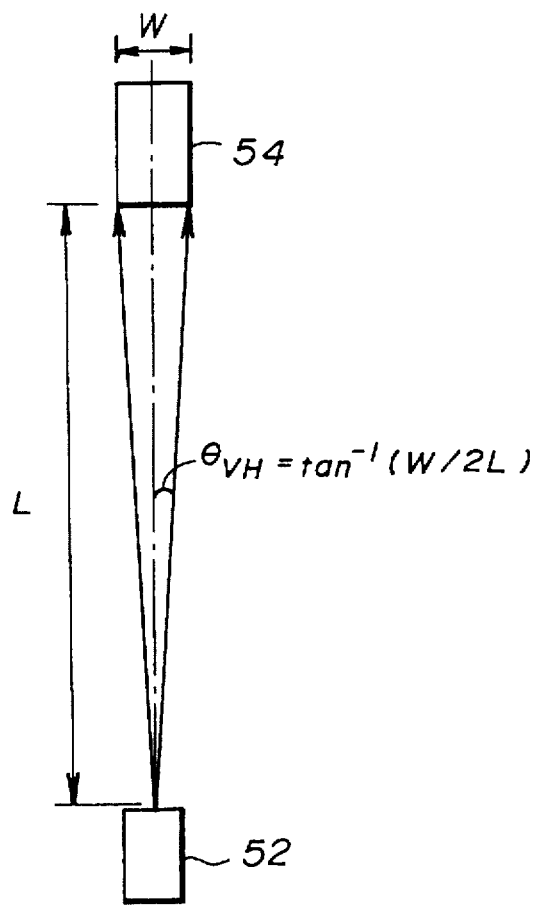
FIG. 4 is an illustration of an object and a radar equipped vehicle moving in the same lane.

FIG. 4 is an illustration of an object 54 and the vehicle 52 moving in the same lane. The object 54, which is, for example, a vehicle anterior to the radar equipped vehicle 52, is spaced from the radar equipped vehicle 52 with a distance L. The longitudinal axis of the object 54 aligns with the longitudinal axis of the vehicle 52. In the state shown in FIG. 4, the range of the scan angle $\Theta_S$ at which the anterior object 54 is irradiated by the radar beam of the radar antenna 40 can be represented by the following relationship (1), where W is a width of the object 54.

$$-\tan^{-1}(W/2L) \leq \Theta_S \leq \tan^{-1}(W/2L) \qquad (1)$$

The above relationship (1) can be represented by the following relationship (2), where $\Theta_{VH}$ is an irradiatable scan angle corresponding to the term "$\tan^{-1}(W/2L)$" of the relationship.

$$-\Theta_{VH} \leq \Theta_S \leq \Theta_{VH} \qquad (2)$$

If all of the sets of data with respect to the object 54 are obtained properly, the actual center angle $\Theta_{cent}r$ becomes zero degrees. However, in a practical condition, the actual center angle $\Theta_{cent}r$ does not always become zero degrees. That is, the actual center angle $\Theta_{cent}r$ can possibly vary within the range from $-\Theta_{VH}$ to $\Theta_{VH}$.

The object 54, which is a vehicle moving anterior to the vehicle 52, may move leftwardly or rightwardly within the width of the vehicle moving lane. Considering such movement, the actual center angle $\Theta_{cent}r$ can possibly vary within a range wider than the range from $-\Theta_{VH}$ to $\Theta_{VH}$. Accordingly, in the present embodiment, it is determined that the object 54 and the radar equipped vehicle 52 are in the same lane in a straight road when the following relationship (3) is satisfied, where K is a setting value. In the present embodiment, the setting value K is set to 2.0 (K=2.0). Hereinafter, the area represented by the relationship (3), which is assumed to be an area corresponding to the radar equipped vehicle moving lane, is referred to as a vehicle moving lane area.

$$-K \cdot \Theta_{VH} \leq \Theta_{cent}r \leq K \cdot \Theta_{VH} \qquad (3)$$

Figure 5:
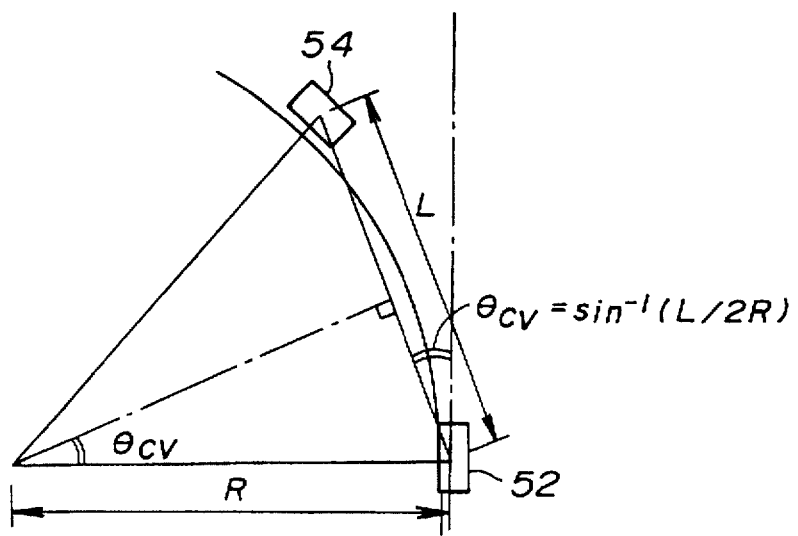
FIG. 5 is an illustration of a state where the object and the vehicle are in the same curved lane.

FIG. 5 is an illustration of a state where the object 54 and the vehicle 52 are in the same curved lane having a radius of curvature R and the distance between the object 54 and the vehicle 52 is maintained at the distance L. When the object 54 and the radar equipped vehicle 52 are moving in the curve, a direction $\Theta_{CV}$ of the object 54 with respect to the vehicle 52 varies in response to the radius of curvature R. In this case, as shown in FIG. 5, the direction $\Theta_{CV}$, which is an angle between the longitudinal axis of the vehicle 52 and a line connecting the object 54 and the vehicle 52, can be represented by the following expression (4).

$$\Theta_{CV} = \sin^{-1}(L/2R) \qquad (4)$$

Accordingly, under such a condition, the actual center angle $\Theta_{cent}r$ of the object 54 moving in the same lane varies from the actual center angle $\Theta_{cent}r$ of straight lane toward the center of the curve by the angle $\Theta_{CV}$. If the angle $\Theta_{VH}$ takes a negative value when the radar equipped vehicle is turning leftwardly, and takes a positive value when the radar equipped vehicle is turning rightwardly, the following relationship (5) is satisfied when the object 54 exists in the vehicle moving lane.

$$\Theta_{CV} - K \cdot \Theta_{VH} \leq \Theta_{cent}r \leq \Theta_{CV} + K \cdot \Theta_{VH} \qquad (5)$$

A straight road is considered to be a curve having an infinite radius of curvature. In this sense, the vehicle moving lane area can be assumed based on the above-mentioned relationship (5) when the object 52 and the vehicle 54 are moving in a straight lane as well as in a curve lane.

The radius of curvature R of the road on which the object 54 is moving can be assumed to be equal to the turning radius of the vehicle 52. In the present embodiment, as mentioned above, the radar ECU 30 functions to detect the turning radius Rt of the vehicle 52. Thus, according to the present invention, the direction $\Theta_{CV}$ used in the above relationship (5) can be obtains based on the turning radius Rt calculated by the radar ECU 30. Thus, in the present embodiment, the vehicle moving lane area can be defined when the vehicle 52 is moving in a straight lane or curved lane.

Figure 6:
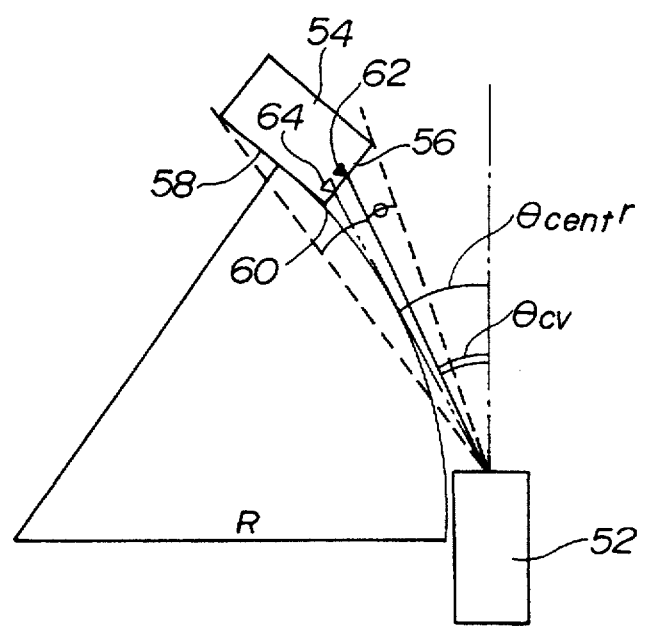
FIG. 6 is an illustration of a state where the object and the vehicle are moving along a curve having a radius of curvature R.

When the radar equipped vehicle 52 and the object 54 are moving in a curve, the radar apparatus provided on the vehicle 52 tends to detect the actual center angle $\Theta_{cent}r$ of the object 54 to be shifted from the direction of angle $\Theta_{CV}$ toward the inner side of the curve. A description will now be given, with reference to FIG. 6, of the reason for such a phenomenon. FIG. 6 is an illustration of a state where the object 54 and the radar equipped vehicle 52 are moving in the same curve having a radius of curvature R. When the object 54 and the radar equipped vehicle 52 are moving in a curve, the rear end of the object 54 is not parallel to the front end on the vehicle 52. In this case, the radar wave emitted by the radar antenna 40 is projected on a rear face 56, a side face 58 positioned on the inner side of the curve and a corner 60 between the rear face 56 and the side face 58.

The radar wave projected onto the rear face 56 and the side face 58 of the object 54 is reflected mainly in directions different from the direction of the radar equipped vehicle 52. On the other hand, the radar wave projected onto the corner 60 of the object 54 is reflected toward the radar equipped vehicle 52. Thus, the detection result of the object 54 by the radar apparatus on the vehicle 52 is concentrated into an area at or near the corner 60 of the object 54.

In FIG. 6, a black triangle mark in the object 54 indicates a position 62 of the center of the width of the rear face of object 54. The radar ECU 30 assumes the direction $\Theta_{CV}$ of the object 54 as the direction of the center position 62 based on the relative distance RD between the object 54 and the vehicle 52 and the radius of curvature R of the curve.

In FIG. 6, a blank triangle mark indicates a position 64 of the center of the object 54 detected from the data obtained by the radar apparatus. That is, the position 64 indicates the detected center of the object 54. The radar ECU 30 detects the actual center angle $\Theta_{cent}r$ as an angle formed between the longitudinal direction of the radar equipped vehicle 52 and the detected center of the object 54.

The detected center 64 is shifted toward the inner side of the curve from the center position 62 since the detection of the object 54 is concentrated in the corner 60 of the object 54. Thus, when the vehicle 52 and the object 54 are moving in the curve, the actual center angle $\Theta_{cent}r$ is detected as it is shifted from the direction $\Theta_{CV}$ toward the inner side of the curve.

The vehicle moving lane area determined by the above-mentioned relationship (5) is equally spread to either side of the line indicated by the direction $\Theta_{CV}$. If the detected center 64 of the object 54 corresponds to the center position 62 of the object 54, an accurate determination can be made as to whether the object 54 exists in the vehicle moving lane by determining whether or not the detected center 64 is included in the vehicle moving lane area defined by the relationship (5).

However, if the determination as to whether the object 54 exists in the vehicle moving lane area is performed when the detected center 64 is shifted or off set toward the inner side of the curve as shown in FIG. 6, there is a possibility that the object 54 in the vehicle moving lane is determined to be out of the vehicle moving lane. In the present embodiment, the vehicle moving lane area defined by the relationship (5) is used as a reference vehicle moving lane area. In order to eliminate such an erroneous determination, the radar apparatus according to the present invention corrects the reference vehicle moving lane area, when the radar equipped vehicle is moving in a curve, so that the portion of the vehicle moving lane area on the inner side of the curve is increased as compared to the portion of the vehicle moving lane area on the outer side of the curve.

Figure 7:
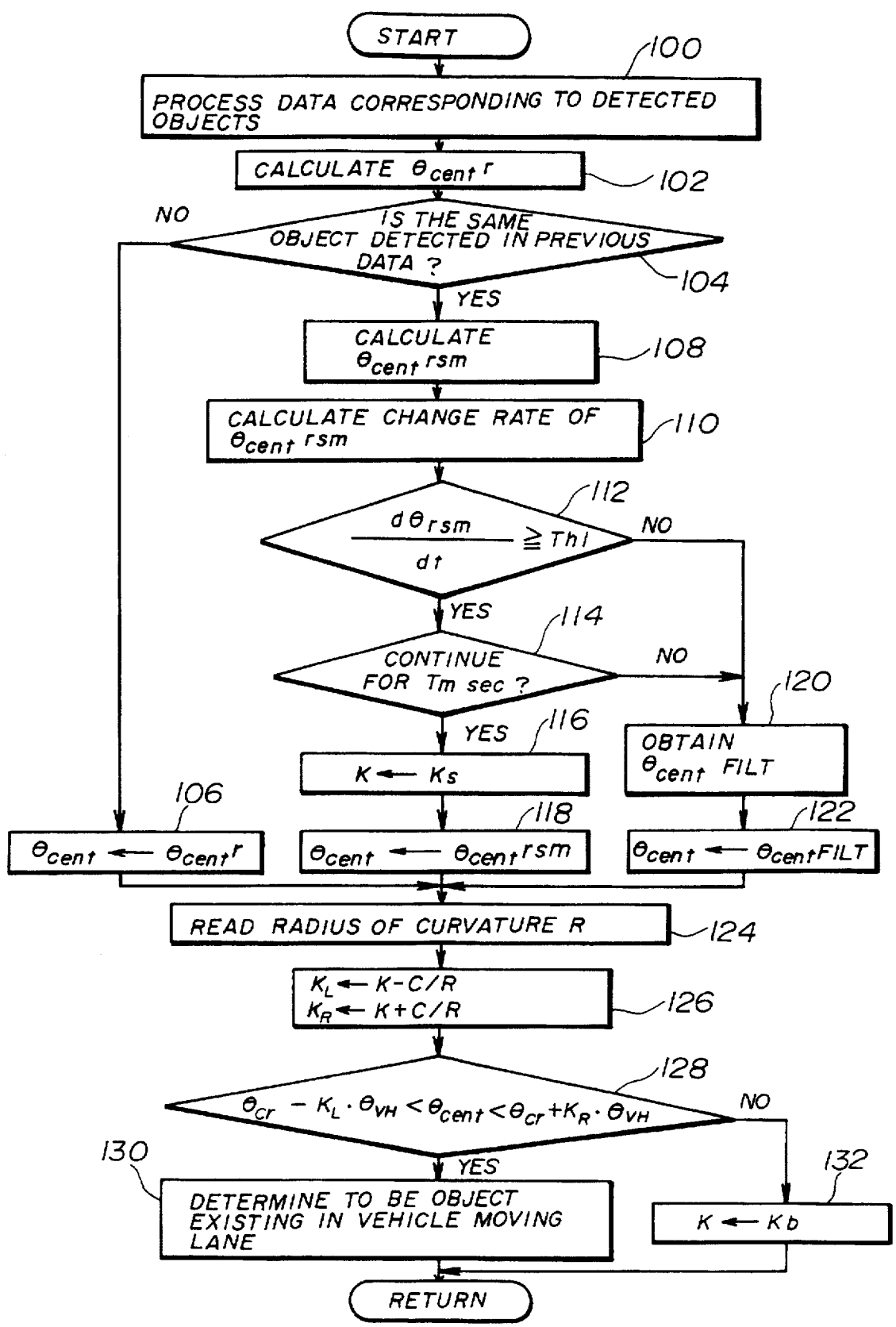
FIG. 7 is a flowchart of a control routine performed by a radar ECU shown in FIG. 1.

FIG. 7 is a flowchart of a control routine performed by the radar ECU shown in FIG. 1 to achieve the above-mentioned function. The control routine shown in FIG. 7 is started every time the scanning operation is performed by the radar antenna 40 from −10 degrees to +10 degrees of the scan angle $\Theta_S$, that is, the routine is started for each 100 msec.

When the routine shown in FIG. 7 is started, the data with respect to objects detected by the scanning of the radar antenna 40 is processed in step 100. In this step, sets of data each of which are supposed to be derived from a single object is grouped from among all data. Additionally, the relative distance RDi and the relative velocity RVi of each of the objects recognized by the grouping of the data are calculated. The suffix "i" is the number of each of the detected objects.

Then, in step 102, the actual center angle $\Theta_{cen}r$ of each of the detected objects is calculated based on the grouped sets of data. In the present embodiment, the center of each grouped sets of data, that is, the data center of each of the grouped sets of data is determined to be the center of each of the corresponding objects. Additionally, in step 102, the direction of the detected center is determined to be the actual center angle $\Theta_{cen}r$ with respect to the longitudinal direction of the vehicle 52. Thereafter, the routine proceeds to step 104.

In step 104, it is determined whether or not each of the objects detected at this time was detected in the previous process. If there is an object for which no corresponding data exists in the previous data, the object is determined to be a new object which has entered in the detectable range of the radar. In this case, the routine proceeds to step 106. The object detected in the detectable range and being processed is hereinafter referred to as a current object.

In step 106, the actual center angle $\Theta_{cen}r$ of the current object determined as the object existing in the detectable range is stored as the center angle of the object in step 103. The center angle of the object is referred to as an object center angle $\Theta_{cen}$. The object center angle $\Theta_{cen}$ is a characteristic value used as a base of the determination when it is determined whether or not the current object exists in the vehicle moving lane. According to the above-mentioned process, the actual center angle $\Theta_{cen}r$ of the object newly detected in the current process is determined to be equal to the object center angle $\Theta_{cen}$. Accordingly, the determination of the object newly detected in the detectable range as to whether the object exists in the vehicle moving lane is performed based on the actual center angle $\Theta_{cen}r$. After the process of step 106 is completed, the routine proceeds to step 124.

If it is determined, in step 104, that the current object was detected in the previous data, it is determined that the current object has been continuously existing in the detectable range of the radar apparatus. In this case, the routine proceeds to step 108.

In step 108, a blunted value $\Theta_{cen}rsm$ is calculated with respect to the actual center angle $\Theta_{cen}r$. The blunted value $\Theta_{cen}rsm$ is obtained by processing the actual center value $\Theta_{cen}r$ with a low-pass filter having a relatively high cut-off frequency such as 1 Hz. It should be noted that the cut-off frequency of 1 Hz is selected so that the phase of the blunted value $\Theta_{cen}rsm$ is not delayed for a considerable period. Accordingly, if a large change is generated in the actual center angle $\Theta_{cen}r$, the blunted value $\Theta_{cen}rsm$ follows immediately after the change of the actual center angle $\Theta_{cen}r$. Thereafter, the routine proceeds to step 110.

In step 110, a change rate $d\Theta rsm/dt$ of the blunted value $\Theta_{cen}rsm$ is calculated. The actual center angle $\Theta_{cen}r$ frequently changes while the vehicle 52 is moving. Thus, if the actual center angle $\Theta_{cen}r$ is directly used for the control, the control may be bothered or influenced by the frequent change of the actual center angle $\Theta_{cen}r$. In order to eliminate such a problem, the blunted value $\Theta_{cen}rsm$ is used in the present embodiment. After the process of the step 110 is completed, the routine proceeds to step 112.

In step 112, it is determined whether or not the change rate $d\Theta rsm/dt$ of the blunted value $\Theta_{cen}rsm$ generated during a period from the last process to the current process is equal to or greater than a predetermined value Th1. A a change occurs in the blunted value $\Theta_{cen}rsm$ when the object 54 changes a lane or the object 54 enters or exits a curve prior to the vehicle 52.

When an object is close to the vehicle 52, a relatively large change occurs in the blunted value $\Theta_{cen}rsm$ when the vehicle changes a lane as compared to a case where the object is remote from the vehicle 52. Hereinafter, the object close to the vehicle 52 is referred to as a short distance object, and the object remote from the vehicle 52 is referred to as a long distance object. Additionally, an object positioned between the short distance object and the long distance object may be referred to as a middle distance object. The predetermined value Th1 is smaller than a value of the change rate $\Theta_{cen}rsm$ generated when the short distance value changes a lane, and is greater than a value of the change rate $\Theta_{cen}rsm$ generated when the middle distance object or the long distance object changes a lane.

Accordingly, if it is determined, in step 112, that the condition $d\Theta rsm/dt \geq Th1$ is satisfied, it is recognized that the current object is the short distance object and the current object shows movement such as a lane change. In this case, the routine proceeds to step 114.

In step 114, it is determined whether or not the change rate $d\Theta rsm/dt$ continuously exceeds for a predetermined time period Tm sec. When the short distance object changes a lane, the blunted value is continuously changed after the blunted value $\Theta_{cen}rsm$ of the object starts to change and continues until the lane change of the object is completed. On the other hand, when the short distance object enters or exits a curve, the change in the blunted value $\Theta_{cen}rsm$ is stopped at the time the vehicle 52 entered or exited the curve by following the object ahead of the vehicle 52.

Accordingly, the blunted value $\Theta_{cen}rsm$ of the short distance object, when the short distance object performs a lane change, shows a change lasting for a relatively long period of time as compared to a change when the short distance object enters or exits a curve. The predetermined time period Tm used in step 114 is shorter than the time period during which the blunted value $\Theta_{cen}rsm$ is continuously changed when the short distance object performs a lane change. Additionally, the predetermined time period Tm is longer than the time period during which the blunted value $\Theta_{cen}rsm$ is continuously changed when the short distance object enters or exits a curve.

Accordingly, if it is determined, in step 114, that the relationship dΘrsm≧Th1 is satisfied, it can be recognized that the short distance object performed a lane change. In this case, the routine proceeds to step 116.

In step 116, a predetermined value Ks is substituted for the setting value K in the above-mentioned relationship (5). The setting value K is used for defining an extent of the reference vehicle moving lane area. In the present embodiment, the reference vehicle moving lane area is increased as the setting value K is increased. The predetermined value Ks substituted for the setting value K in step 116 is smaller than a standard value Kb prepared for the setting value K. Thus, when the process of step 116 is performed, the extent of the reference vehicle moving lane area is set to be narrower than that obtained by the standard value Kb. After the above-mentioned process is completed, the routine proceeds to step 118.

In step 118, the blunted value $\Theta_{cen}rsm$ of the current object is stored as the object center angle $\Theta_{cen}r$ of the current object. It will be determined based on the blunted value $\Theta_{cen}rsm$ and the reference vehicle moving lane area defined to be narrower than the area defined by the standard value as to whether or not the current object corresponds to the vehicle moving lane object.

In the present embodiment, if the blunted value of the short distance object is out of the vehicle moving lane area, it is determined that the short distance object moved from the vehicle moving lane to another lane. Accordingly, if the reference vehicle moving lane area is set to be narrower than the standard vehicle moving lane area, the time period after the short distance object start to change a lane and until the blunted value of the short distance object is shifted out of the vehicle moving lane area is shortened. Thus, according to the radar apparatus of the present embodiment, the short distance object can be excluded from the vehicle moving lane objects immediately after the short distance object starts to move to another lane.

If it is determined, in step 112, that the relationship dΘrsm≧Th1 is not satisfied, or if it is determined, in step 114, that the relationship dΘrsm≧Th1 is continued for the predetermined time period Tm, it is recognized that the current object is not the short distance object or otherwise the current object is the short distance object but does not show the movement of a lane change. In this case, the routine proceeds to step 120.

In step 120, a delay direction $\Theta_{cen}FILT$ is calculated with respect to the actual central angle $\Theta_{cen}r$ of the current object. The delay direction $\Theta_{cen}FILT$ is calculated by substituting the three most recent actual center angles $\Theta_{cen}r$ ($\Theta_{cen}r(n)$, $\Theta_{cen}r(n-1)$ and $\Theta_{cen}r(n-2)$) and the two most recent delay directions $\Theta_{cen}FILT$ ($\Theta_{cen}FILT(n-1)$ and $\Theta_{cen}FILT(n-2)$) into the following expression (5).

$$\Theta_{cen}r = k1 \cdot \Theta_{cen}r(n) + k2 \cdot \Theta_{cen}r(n-1) + k3 \cdot \Theta_{cen}r(n-2) + k4 \cdot \Theta_{cen}FILT(n-1) + k5 \cdot \Theta_{cen}FILT(n-2) \quad (6)$$

The above-mentioned expression (6) is a calculation formula for forming a digital low-pass filter. In the expression (6), the constants k1 to k5 are provided for determining the cut-off frequency of the filter. In this embodiment, values of the constants k1 to k5 are set so that the cut-off frequency becomes 0.25 Hz.

After the process of step 120 is completed, the routine proceeds to step 122. In step 122, the delay direction $\Theta_{cen}FILT$ is stored as an object center angle $\Theta_{cen}r$, and the routine proceeds to step 106. It will be determined later based on the standard vehicle moving lane area obtained by substituting the predetermined value Ks for the setting value K and the delay direction $\Theta_{cen}r$ which gently follows a change in the actual center angle $\Theta_{cen}r$ as to whether or not the current object corresponds to the vehicle moving lane object.

Figure 8A:
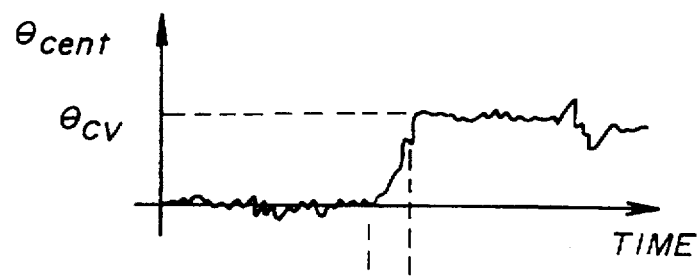
FIG. 8A is a graph showing a variation of an actual center angle $\Theta_{cent}r$ when an object and a radar equipped vehicle enters a curve.

FIG. 8A is a graph showing a variation of the actual center angle $\Theta_{cen}r$ when an object moving in the radar equipped vehicle moving lane enters a curve at time t1 and then the radar equipped vehicle 52 enters the curve at time t2. As shown in FIG. 8A, the actual center angle $\Theta_{cen}r$ is maintained to be constant until the time t1 is reached. The actual center angle $\Theta_{cen}r$ is varied from the time t1 to the time t2. Then, after the time t1 has passed, the actual center angle $\Theta_{cen}r$ is maintained to be close to the angle $\Theta_{CV}$ which is determined by the radius of curvature R of the curve and the distance between the object and the radar equipped vehicle.

Figure 8B:
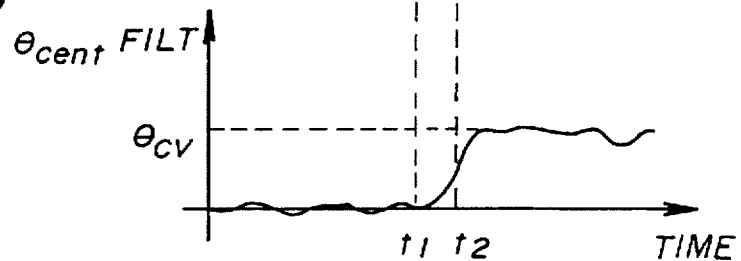
FIG. 8B is a graph showing a variation of a delay direction $\Theta_{cent}$FILT corresponding to the variation of the actual center angle $\Theta_{cent}r$ shown in FIG. 7A.

FIG. 8B is a graph showing a variation of the delay direction $\Theta_{cen}FILT$ corresponding to the variation of the actual center angle $\Theta_{cen}r$ shown in FIG. 8A. As shown in FIG. 8B, the variation of the delay direction $\Theta_{cen}FILT$ is gentle and smooth as compared to the variation of the actual center angle $\Theta_{cen}r$, and varies to follow the actual center angle $\Theta_{cen}r$ from the time t1 with a slight delay with respect to the variation of the actual center angle $\Theta_{cen}r$.

Figure 9:
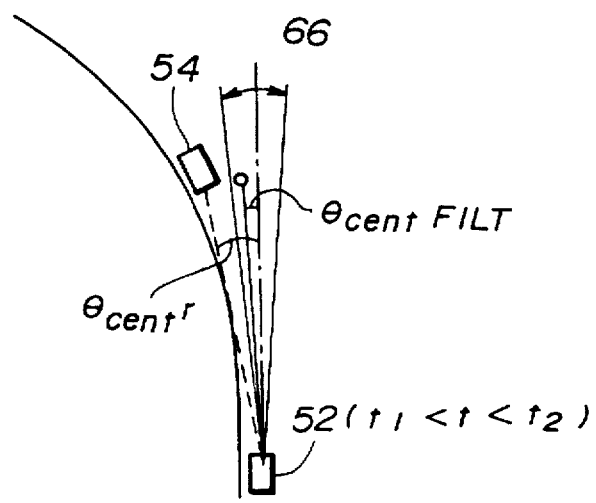
FIG. 9 is an illustration for explaining a relationship between the actual center angle $\Theta_{cent}r$ and the delay direction $\Theta_{cent}$FILT when the object enters a curve.

FIG. 9 is an illustration for explaining a relationship between the actual center angle $\Theta_{cen}r$ and the delay direction $\Theta_{cen}FILT$ established during a period from the time t1 to the time t2. In FIG. 9, a vehicle moving lane area indicated by the reference numeral 66 corresponds to the vehicle moving lane recognized by the radar equipped vehicle 52. As discussed above, the delay direction $\Theta_{cen}FILT$ varies slightly later than the variation of the actual center angle $\Theta_{cen}r$. Thus, when the actual center angle $\Theta_{cen}r$ is shifted out of the reference vehicle moving lane area due to the object 54 entering the curve, the delay direction $\Theta_{cen}FILT$ still remains in the vehicle moving lane area 66.

Figure 10:
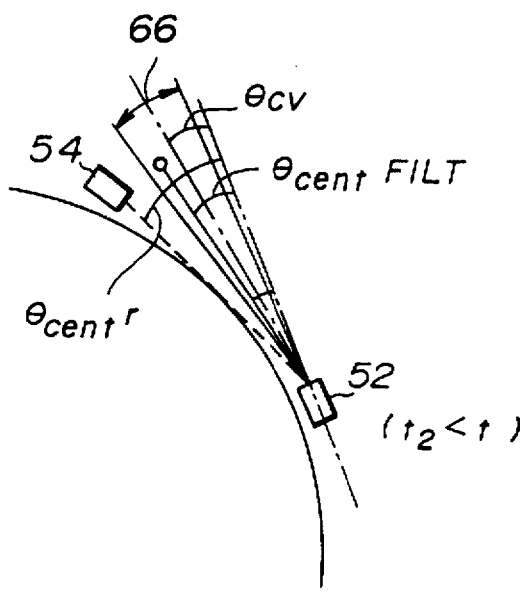
FIG. 10 is an illustration for explaining a relationship between the actual center angle $\Theta_{cent}r$ and the delay direction $\Theta_{cen}$FILT established when both the object and the radar equipped vehicle are in the same curve.

FIG. 10 is an illustration for explaining a relationship between the actual center angle $\Theta_{cen}r$ and the delay direction $\Theta_{cen}FILT$ established after the time t2 and until the object 54 exits the curve. That is, the relationship shown in FIG. 10 is established when both the object 54 and the radar equipped vehicle 52 are moving in the same curve. After the time t1, the delay direction $\Theta_{cen}FILT$ is gradually varied toward a direction in which the difference between the actual center angle $\Theta_{cen}r$ and the delay direction $\Theta_{cen}FILT$ is decreased. On the other hand, the vehicle moving lane area 66 is shifted toward the turning direction of the vehicle 52 due to the turning motion of the vehicle 52 after the vehicle 52 enters the curve. As a result, the delay direction $\Theta_{cen}FILT$ remains in the vehicle moving lane area 66 recognized by the radar equipped vehicle 52.

Figure 11:
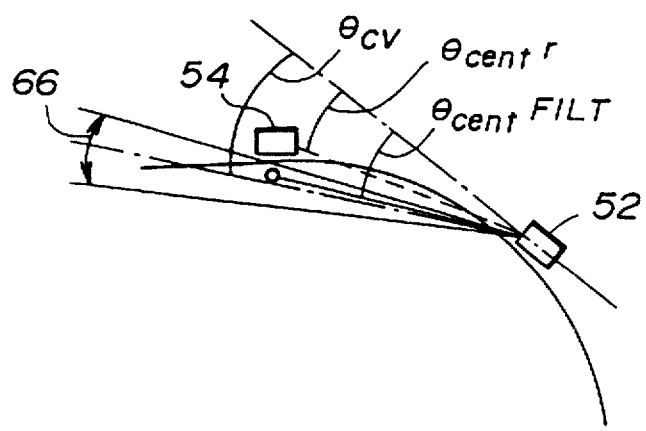
FIG. 11 is an illustration for explaining a relationship between the actual center angle $\Theta_{cen}$r and the delay direction $\Theta_{cen}$FILT established immediately after the object exits the curve.

FIG. 11 is an illustration for explaining a relationship between the actual center angle $\Theta_{cen}r$ and the delay direction $\Theta_{cen}FILT$ established immediately after the object 54 exits the curve. After the objects reach the exit of the curve, the actual center angle $\Theta_{cen}r$ is decreased, and will be shifted out of the vehicle moving lane area 66. However, the delay direction $\Theta_{cen}FILT$ remains in the vehicle moving lane area 66 since the delay direction $\Theta_{cen}FILT$ varies with a delay with respect to the actual center angle $\Theta_{cen}r$.

As discussed above, the delay direction $\Theta_{cen}FILT$, which is the blunted value of the actual center angle $\Theta_{cen}r$, remains in the vehicle moving lane area 66 from the time the object 54 anterior to the radar equipped vehicle 52 enters the curve and until the radar equipped vehicle 52 exits the curve. Accordingly, it is possible to perform an accurate determination for a curve moving condition including immediately before the entrance and immediately after the exit of the curve by determining whether the object 54 and the vehicle 52 are in the same lane based on whether or not the delay direction $\Theta_{cent}$FILT exists in the vehicle moving lane area 66.

In the present embodiment, it is determined, based on the determination as to whether the delay direction $\Theta_{cent}$FILT is included in the vehicle moving lane area 66, whether the object subjected to the process of step 120 and 122 corresponds to the vehicle moving lane object. Thus, an accurate determination can be performed in any area including the entrance and exit of a curve as to whether the objects which are subjected to the process of step 120 and 122 corresponds to the vehicle moving lane object, the objects including the middle distance object, the long distance object and the short distance object which is not performing a lane change.

In the routine shown in FIG. 7, after the process of step 106, 118 or 122 is performed for each of the detected objects, that is, after the setting of the object center angle $\Theta_{cent}$ is completed for each of the detected objects, the routine proceeds to step 124.

In step 124, the radius of curvature R of the curve where the vehicle 52 is moving, which was calculated in a different routine, is read. Thereafter, the routine proceeds to step 126.

In step 126, the reference vehicle moving lane area is corrected in response to the radius of curvature R. More specifically, a left side correction factor $K_L$ and a right side correction factor $K_R$ are obtained based on the setting value K, a constant C and the radius of curvature R, the correction factor being substituted by the standard value Kb or the predetermined value ks smaller than the standard value Kb. The left side correction factor $K_L$ and the right side correction factor $K_R$ are calculated by the following equations (7) and (8), respectively.

$$K_L = K - C/R \quad (7)$$

$$K_R = K - C/R \quad (8)$$

It should be noted that the radius of curvature R (corresponding to the turning radius Rt) is a negative value when the vehicle 52 turns to left, and is a positive value when the vehicle 52 turns to right.

According to the above process, the left side correction factor $K_L$ and the right side correction factor $K_R$ are equal to each other when the vehicle 52 is moving in a straight lane. The left side correction factor $K_L$ is increased and the right side correction factor $K_R$ is decreased as the turning radius R is decreased when the vehicle 52 is making a left turn. On the other hand, the left side correction factor $K_L$ is decreased and the right side correction factor $K_R$ is increased as the turning radius R is decreased when the vehicle 52 is making a right turn. After the above-mentioned process is completed, the routine proceeds to step 128.

In step 128, it is determined whether or not the object center angle $\Theta_{cent}$ obtained for each object satisfies a condition indicated by the following relationship (9). Hereinafter, this condition is referred to a vehicle moving lane area condition.

$$\Theta_{CV} - K_L \cdot \Theta_{VH} < \Theta_{cent} < \Theta_{CV} + K_R \cdot \Theta_{VH} \quad (9)$$

According to the relationship (9), the vehicle moving lane area is spread equally to the left side and the right side with an angle "K·$\Theta_{VH}$" with respect to the direction $\Theta_{CV}$ of the center position of the object when the vehicle 52 is moving in a straight lane. Additionally, when the vehicle 52 is moving in a straight lane, the center position of the width of the object approximately corresponds to the direction indicated by the object center angle $\Theta_{cent}$. In this case, determination result as to whether the object center angle $\Theta_{cent}$ satisfies the vehicle moving lane area condition closely corresponds to the determination result as to whether the object exists in the vehicle moving lane. Thus, according to the process of step 128, an accurate determination can be performed as to whether or not the object corresponds to the vehicle moving lane object when the vehicle 52 is moving in a straight lane.

According to the process based on the relationship (9), when the vehicle 52 is moving in a left turn curve, the vehicle moving lane area is corrected so that the left side of the vehicle moving lane area is expanded as compared to the right side of the vehicle moving lane area. Additionally, when the vehicle 52 is moving in a left turn curve, the object center angle $\Theta_{cent}$ is detected in an area on the left side with respect to the center position of the width of the object. As mentioned above, in the present embodiment, when the vehicle 52 is moving in a left turn curve, both the object center angle $\Theta_{cent}$ and the vehicle moving lane area are offset to the left side with respect to the direction $\Theta_{CV}$ of the center position of the object. Under such a condition, a determination result as to whether the object center angle $\Theta_{cent}$ satisfies the vehicle moving lane area condition closely corresponds to a determination result as to whether the object exists in the vehicle moving lane. Thus, according to the process of step 128, an accurate determination can be performed as to whether or not the object corresponds to the vehicle moving lane object when the vehicle 52 is moving in a left turn curve.

Additionally, according to the process based on the relationship (9), when the vehicle 52 is moving in a right turn curve, the vehicle moving lane area is corrected so that the right side of the vehicle moving lane area is expanded as compared to the left side of the vehicle moving lane area. Additionally, when the vehicle 52 is moving in a right turn curve, the object center angle $\Theta_{cent}$ is detected in an area on the right side with respect to the center position of the width of the object. As mentioned above, in the present embodiment, when the vehicle 52 is moving in a right turn curve, both the object center angle $\Theta_{cent}$ and the vehicle moving lane area are offset to the right side with respect to the direction $\Theta_{CV}$ of the center position of the object. Under such a condition, a determination result as to whether the object center angle $\Theta_{cent}$ satisfies the vehicle moving lane area condition closely corresponds to a determination result as to whether the object exists in the vehicle moving lane. Thus, according to the process of step 128, an accurate determination can be performed as to whether or not the object corresponds to the vehicle moving lane object when the vehicle 52 is moving in a right turn curve.

Accordingly, in the process of step 128, an accurate determination can be performed as to whether the object corresponds to the vehicle moving lane area in each case where the vehicle 52 is moving in a straight lane, in a left turn curve or in a right turn curve. The current object determined to satisfy the vehicle moving lane condition is subjected to the process of step 130. On the other hand, if it is determined, in step 128, that the object center angle $\Theta_{cent}$ does not satisfy the vehicle moving lane condition, the routine proceeds to step 132.

In step 130, it is determined that the current object corresponds to the vehicle moving lane object. On the other hand, in step 132, the standard value Kb is substituted for the setting value K. After the process of step 130 or step 132 is performed for each of the detected objects, the routine is ended.

In the present embodiment, in order to correct the vehicle moving lane area in response to the turning radius of the vehicle 52, the left side area and the right side area of the vehicle moving lane area with respect to the direction $\Theta_{CV}$ of the center position of the object is increased or decreased simultaneously. However, the correction of the vehicle moving lane area may be achieved by increasing or decreasing one of the left side area and the right side area.

Additionally, in the above-mentioned embodiment, the vehicle moving lane area is defined by the area defined in the left side of the direction $\Theta_{CV}$ with the angle $K_L\Theta_{VH}$ and the area defined in the right side of the direction $\Theta_{CV}$ with the angle $K_R\Theta_{CV}$. However, a fixed area having a width corresponding to the width of the object may be provided between the left side area and the right side area. The center of the fixed area corresponds to the direction $\Theta_{CV}$ of the center position of the object. Various shapes, such as a square, a trapezoid or triangle, may be adopted for the configuration of the fixed area, the left side area and the right side area. It is appreciated that advantages similar to the above-mentioned embodiment can be achieved by increasing or decreasing one of the left side area and the right side area. In this case, since the fixed area having a width corresponding to the width of the object is provided, an excessive correction to the vehicle moving lane area is prevented.

The present invention is not limited to the specifically disclosed embodiments, and variations and modifications may be made without departing from the scope of the present invention.

What is claimed is:

1. A scan-type radar apparatus provided on a vehicle, comprising:

a scan-type radar for detecting objects existing in a detectable range;

object direction assuming means for assuming a center direction indicating a center of each of the objects detected by said scan-type radar with respect to said vehicle based on a distance between said vehicle and each of the objects and a radius of curvature of a curve where said vehicle is moving;

vehicle moving lane area setting means for setting a vehicle moving lane area corresponding to a vehicle moving lane in which said vehicle is moving, said vehicle moving lane area being set within said detectable range of said scan-type radar, said vehicle moving lane area extending on either side of said center direction with a predetermined angle range; and vehicle moving lane area correcting means for correcting an extent of the vehicle moving lane area so that an inner area of said vehicle moving lane area is increased when said vehicle is moving along the curve, said inner area being a portion of said vehicle moving lane area located on an inner side of the curve with respect to said center direction.

2. The scan-type radar apparatus as claimed in claim 1, wherein said detectable range is scanned with a fixed scan angle, and said vehicle moving lane area correcting means corrects said vehicle moving lane area by shifting a direction of a center of said vehicle moving lane area set by said vehicle moving lane area setting means toward the inner side of the curve.

3. The scan-type radar apparatus as claimed in claim 1, wherein said vehicle moving lane area includes a fixed area between a left side area and a right side area, said fixed area having a predetermined width, said left side area being located on the left side of said center direction and said right side area being located on the right side of said center direction.

4. The scan-type radar apparatus as claimed in claim 3, wherein said predetermined width corresponds to a width of each of the objects.

5. The scan-type radar apparatus as claimed in claim 3, wherein said vehicle moving lane area correcting means corrects the extent of the vehicle moving lane area so that one of the left side area and the right side area is increased when said vehicle is moving along a curve, said one of the left side area and the right side area being located on the inner side of the curve with respect to said fixed area.

6. The scan-type radar apparatus as claimed in claim 1, wherein said detectable range is scanned with a fixed scan angle, and said vehicle moving lane area is defined by an angle range with respect to said center direction.

7. The scan-type radar apparatus as claimed in claim 6, wherein said inner area of said vehicle moving lane area is defined by an angle range, and said vehicle moving lane area correcting means corrects the angle range of said inner area so as to correct an extent of said inner area.

8. The scan-type radar apparatus as claimed in claim 3, wherein each of said left side area and said right side area is defined by an angle range, and said vehicle moving lane area correcting means corrects the angle range of one of said left side area and said right side area so as to correct an extent of said one of said left side area and said right side area.

9. The scan-type radar apparatus as claimed in claim 1, wherein said vehicle moving lane area correcting means comprises correction amount determining means for determining an amount of correction based on the radius of curvature of the curve.

10. The scan-type radar apparatus as claimed in claim 3, wherein said vehicle moving lane area correcting means comprises correction amount determining means for determining an amount of correction based on the radius of curvature of the curve.

* * * * *

UNITED STATES PATENT AND TRADEMARK OFFICE
CERTIFICATE OF CORRECTION

PATENT NO. : 5,745,070

DATED : April 28, 1998

INVENTOR(S) : YAMADA

It is certified that error appears in the above-identified patent and that said Letters Patent is hereby corrected as shown below:

On title page, item [54] and col. 1, lines 1-3:

correct the title of the invention:

-- [54] SCAN-TYPE RADAR APPARATUS FOR A VEHICLE TO ACCRUATELY DETECT AN OBJECT IN A LANE OF THE RADAR EQUIPPED VEHICLE MOVING IN A CURVE --

Signed and Sealed this

First Day of December, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,745,070
DATED : April 28, 1998
INVENTOR(S) : YAMADA

It is certified that error appears in the above-identified patent and that said Letters Patent is hereby corrected as shown below:

On the title page, item [54] and Column 1, line 1, the title should read
-- SCAN-TYPE RADAR APPARATUS FOR A VEHICLE TO ACCURATELY DETECT AN
   OBJECT IN A LANE OF THE RADAR EQUIPPED VEHICLE MOVING IN A CURVE --

This certificate supersedes Certificate of Correction issued December 1, 1998.

Signed and Sealed this

Sixth Day of July, 1999

*Attest:*

Q. TODD DICKINSON

*Attesting Officer*  Acting Commissioner of Patents and Trademarks